United States Patent [19]

Del Fabro et al.

[11] Patent Number: 4,524,656
[45] Date of Patent: Jun. 25, 1985

[54] METHOD FOR CUTTING METAL RODS INTO SHORTER LENGTHS

[75] Inventors: Marcello Del Fabro; Giorgio Del Fabro, both of Udine, Italy

[73] Assignee: SAE s.r.l., Udine, Italy

[21] Appl. No.: 536,335

[22] Filed: Sep. 27, 1983

[30] Foreign Application Priority Data

Sep. 27, 1982 [IT] Italy .............................. 83452 A/82

[51] Int. Cl.³ .............................................. B23D 33/02
[52] U.S. Cl. .......................................... 83/23; 83/42; 83/153; 83/277; 83/281
[58] Field of Search ............... 83/277, 279–281, 83/417, 153, 23, 42

[56] References Cited

U.S. PATENT DOCUMENTS

| 3,466,958 | 9/1969 | Munson | 83/280 |
| 3,513,741 | 5/1970 | Shallenberg | 83/278 |
| 3,877,690 | 4/1975 | Owens | 83/277 X |
| 3,893,357 | 7/1975 | Zahlaus | 83/281 X |
| 4,321,848 | 3/1982 | Millar et al. | 83/277 X |

Primary Examiner—James M. Meister
Attorney, Agent, or Firm—Lee C. Robinson, Jr.

[57] ABSTRACT

A method and apparatus for cutting metal rods into shorter lengths comprising a movable cutting line (A) which is made up of a portal bench (1) which can slide transversely on rails (B) to align itself with a stored bundle of rods, the bench (1) having a first extraction device (2) for the partial extraction of a bundle of rods (b) from the store, arranged so as to transfer onto the feed and cutting line (X—X) a sub-bundle of rods (b') to a second extraction device (3) for subsequent extraction consisting of gripper-pincers (3.1) which can be moved alternately backwards and forwards along the line (X—X), placed upstream of shears (4), which operate in conjunction with a similar device (5) for subsequent extraction and feed placed downstream of the shears.

4 Claims, 22 Drawing Figures

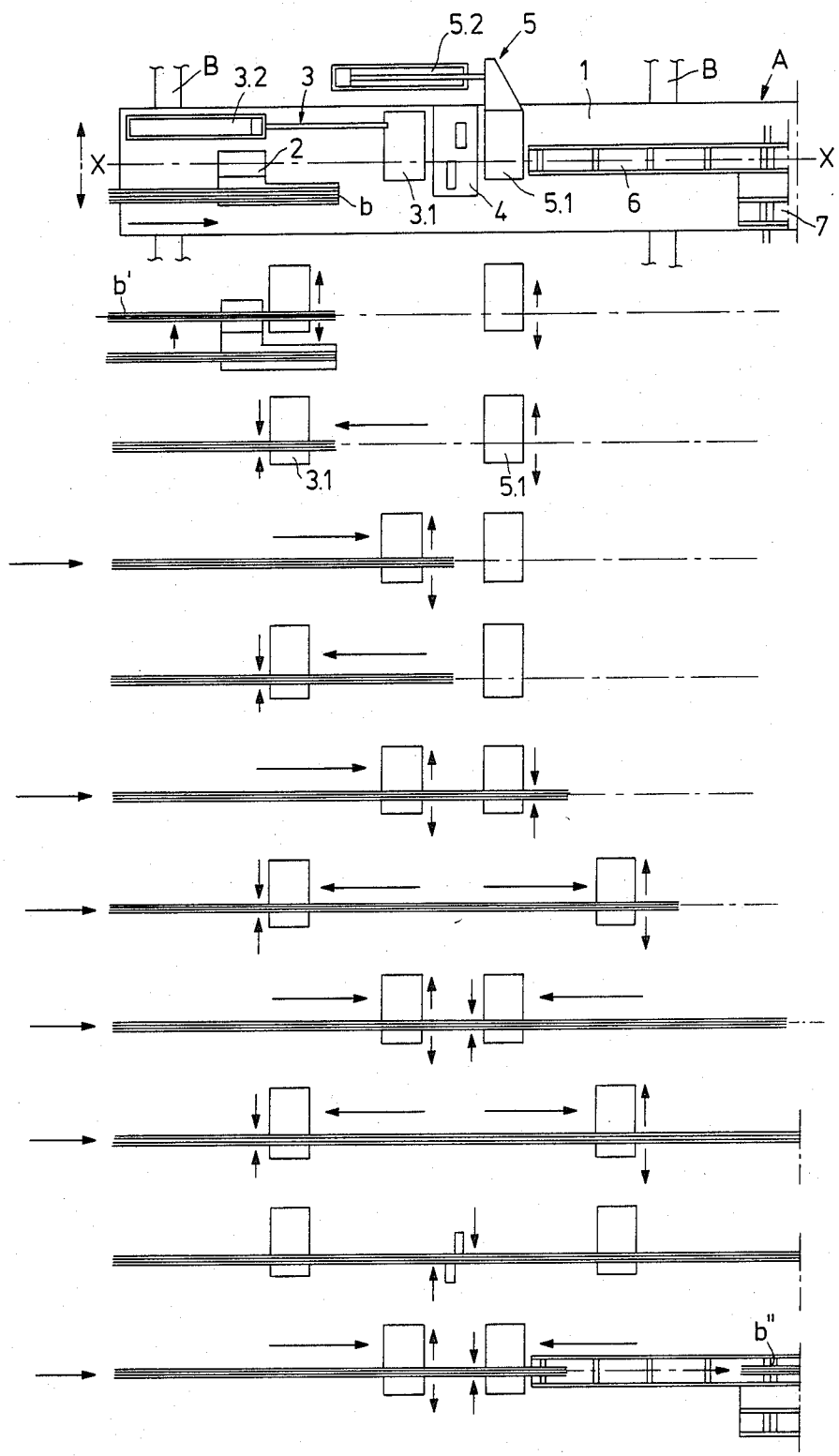

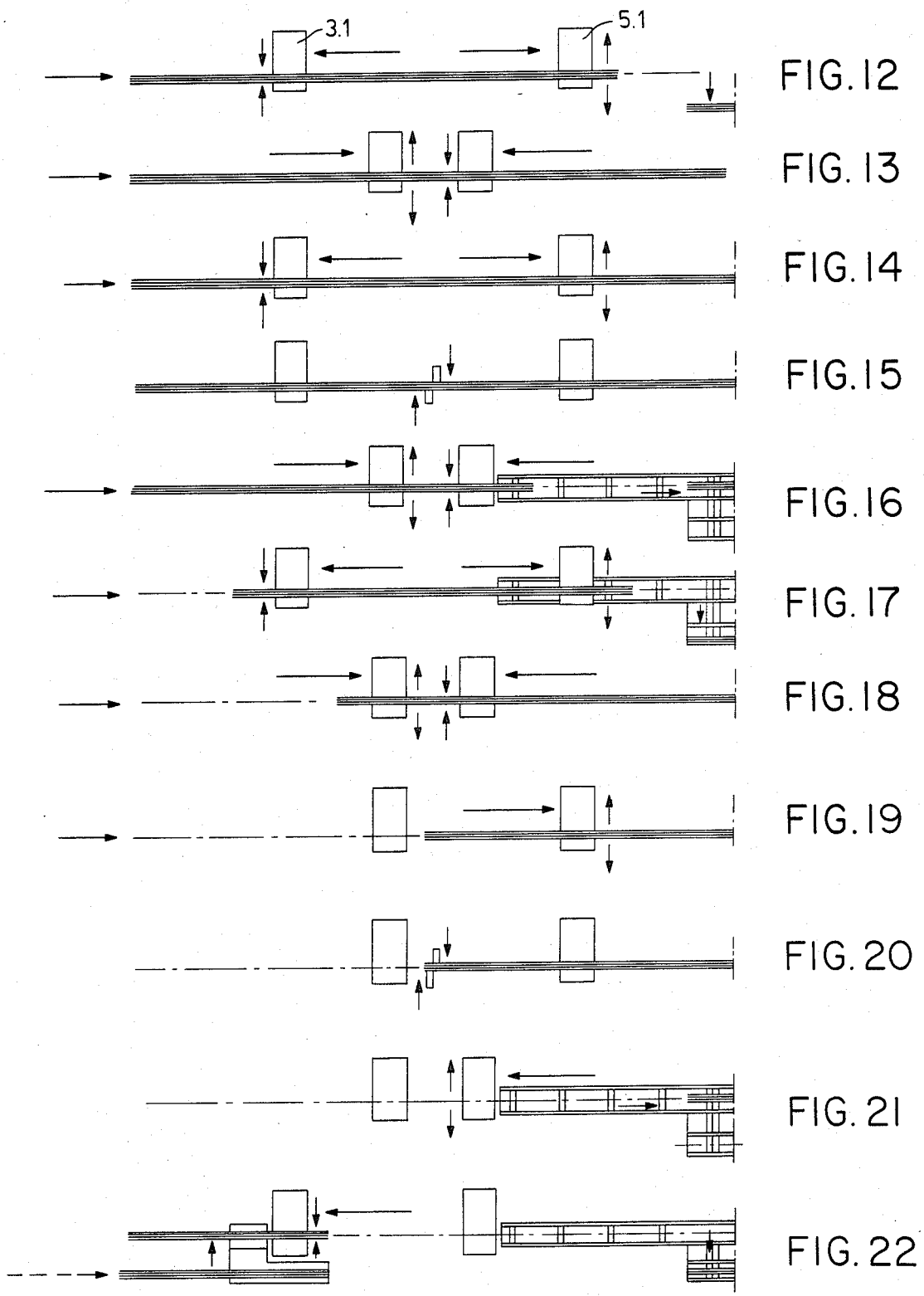

METHOD FOR CUTTING METAL RODS INTO SHORTER LENGTHS

The present invention relates to a method and apparatus for cutting metal rods into shorter lengths.

More particularly the cutting apparatus of the present invention is especially well suited to be used for the extraction of metal rods from large bundles of rods and for cutting them into pieces of desired length for subsequent use in the field of ironworking and in particular in the building sector and prefabricated reinforced-concrete structures.

Consequently, the material subjected to treatment and cutting in the field of the present invention is classified as "smooth or ribbed reinforced-concrete steel rods", and there is a great variety of rods of this type usually with diameters ranging from a minimum of approx. 6 mm (0.23 in) to a maximum of approx. 40 mm (1.57 in).

In the present state of the art, various extraction and cutting apparatus intended for this specific sector are already known, using shearing machines capable of cutting the rods, rod by rod or, as is preferably the case, in multiples (10–20 at a time for instance); such apparatus can be subdivided principally into the following types:

a first type, generally more widely used, has apparatus based on an extremely large store anchored to the floor capable of carrying the various rods, divided according to their respective characteristics, in groups of parallel bundles and this store is linked to at least one machine with a portal bench, arranged longitudinally in the course of the bundles of rods and possible to move transversely on rails in order to position itself at the top end of the bundle of rods in question for their extraction. On the bench of this portal machine are shears, a device for the longitudinal extraction of one or more rods from the bundle, usually of the winch and chain type, the extraction device being capable of extracting the rods by taking them at their top end and causing them to run in a line along the bench beyond the position of the shears, and a stopping device consisting of a ledge stop adjustable to the desired cutting length determined by its distance relative to the shears. The extracted bundle of rods is hit axially at its top end one or more times against this stop positioned at the desired cutting length to achieve the so-called "butting" i.e. top-end alignment of the bundle of rods. After the extraction and butting operations, the extracted section of bars is cut, the pieces being unloaded and the extraction operation by the winch of the top end of the bundle or rods upstream of the shears resumed.

A second type of apparatus has a fixed cutting line with several (four on average) intermediate storage units to contain the same number of different varieties of bundles of rods to be machined. These intermediate storage units are arranged alongside a continuous loading line (usually a line with rollers) positioned upstream and in line with the shearing unit, the previously-described stopping and shearing control equipment being downstream, the latter however being in the form of several ledges which are movable so as to be brought onto the rod feed path to delimit the size of the length to be cut, it being possible to activate this apparatus individually in association with moving the bench supporting it or the shears to regulate the extact length of cut;

a third type of apparatus comprises extraction pincers which grip one or more rods at the same time directly from the extraction bundle to extract them along the cutting line, stopping after a predetermined distance to cut the sections of rod thus extracted. The apparatus continues to operate in this way until the entire length of extracted bars runs out; all things considered, this system is similar to the first, the sole difference being that it does not butt the rods, this being done when the pincers grip. To perform this extraction movement, the shears are arranged so that they can move outside the line of extraction of the pincers when the latter must cross it, an operation which must be performed from time to time;

a fourth type of apparatus uses a drawing system with opposing rollers which grip one or two rods at the same time in order to feed them along the cutting line using more or less similar stopping devices. In this type of apparatus there is obviously a supply of single loose free rods not constrained by the storage bundle.

The noticeable disadvantages of these known embodiments currently used as described above, consist in that:

in the first and third type of apparatus from time to time it is necessary to extract the bundle of rods to be cut, alternating this operation with the shearing stage, which results in extremely long operating times due to the addition of the successive stages. Furthermore both embodiments raise the problem of necessary initial butting, the time taken for this being added to the previous time, moreover, if in the third apparatus the butting operation is not performed initially, a great deal of material would be wasted as scrap in the initial and final shearing stage of the extracted bundle with the further risk of the final rod section being too short for use;

in the second type of apparatus the rods must be extracted from the bundle manually and arranged freely in their respective roller feed paths, this obviously being a very difficult as well as long and time-wasting operation, furthermore the machine line must be of considerable complexity due to the numerous ledge stops and the fact that the shears of the section of bench that follows supporting the ledge stops must be movable;

in the fourth apparatus a limited number of rods (1 or 2 at most) are taken each time; selection is difficult because it must be done manually taking only free rods. The rollers can damage the ribbed rods particularly those which do not have a sufficiently high steel content.

The object of the present invention is to obviate the above-mentioned disadvantages.

The present invention consists in a method for cutting metal rods into shorter lengths using apparatus consisting of a system of stored rods arranged in a fixed manner, parallel and arranged side by side in groups of bundles with homogeneous characteristics, the store of which is connected with at least one movable cutting line at the top end of the bundles of rods of said store, the cutting line being movable transversely and in alignment with the rods and comprising means for the extraction of rods from said stored bundles, means for advancing the rods longitudinally along the cutting line and means for determining the required length of the pieces to be cut, wherein use is made of said cutting line in such a way as to enable the following operations:

to extract longitudinally from a predetermined bundle of rods of the said fixed store, taking an initial section and therefore not the complete length of the bundle, a first bundle of rods;

to transfer, after any butting (i.e. aligning the rods with each other at their top end) from said first partially extracted bundle of rods on the said cutting and material feed line, at least one but preferably a set number of rods equal to or less than the number of rods in the partially extracted bundle of rods;

to grip said sub-bundle using a second extraction and feed device drawing the sub-bundle along said line of subsequent extraction and cutting and continue extraction until passing beyond the shears;

to grip said sub-bundle using a third extraction and feed device drawing the sub-bundle beyond said shears and to continue extraction in dependent association with said second extraction and feed device until the desired and/or programmed cutting length is reached;

to cut the sub-bundle of rods that has passed beyond said shears using the shears themselves and unload the cut pieces;

to resume gripping said sub-bundle using the second extraction and feed device upstream of the shears and continue feeding the sub-bundle beyond said shears;

to resume gripping said sub-bundle using the third extraction and feed device downstream of said shears and continue feeding said sub-bundle beyond the shears until the next required cutting length is reached;

to cut the next section of the sub-bundle of rods and continue the cycle until the entire length is used up and to unload the last waste tail-end section of the bundle of rods along a different path;

to transfer a new sub-bundle of rods from said first partially extracted bundle onto said line of subsequent extraction, feed and cutting, using said first extrusion device;

to grip said new sub-bundle of rods, using the second extraction and feed device upstream of said shears, and to continue extraction, feed and cutting following the procedural stages previously set forth;

to repeat the cycle of the transfer of sub-bundles from the first partially extracted bundle onto said line of further extraction, feed and cutting, until all of the first partially extracted bundle is used up and, during the procedure of further extraction, feed and cutting of said last sub-bundle, to proceed to a new successive partial extraction of a second bundle, using said first partial extraction device, from said storage bundles and carry out the necessary butting operation;

to resume the cycle of transferring the sub-bundles from said line of subsequent extraction, feed and cutting.

The invention also consists in a rod-cutting apparatus for carrying out the method set forth in the immediately preceding paragraph consisting of at least one cutting line with a portal bench, the former being transversely movable by sliding on an underlying system of orthogonal guide rails so as to align with the top end of one of the bundles of rods from the fixed store placed alongside the rails, in which said cutting line includes on said portal bench;

at least one first device of subsequent rod extraction partially to extract a bundle of rods longitudinally from one of the stored bundles, this device being connected with means for butting the partially extracted bars, i.e. means to enable the alignment of the top end of the rods at least for sub-bundles, and also connected with means for the transfer of the sub-bundles onto a line of subsequent extraction, feed and cutting adjacent and parallel to the former;

at least one second device for subsequent rod extraction and feed consisting of gripping means arranged alternately movable along said line of subsequent extraction, feed and cutting, arranged so that it is able, in an intermediate position, to grip said partially extracted bundle of rods and cause it to advance along said line by continuing with the extraction;

at least one shears unit arranged on said second device for subsequent rod extraction and feed, placed on the said line of subsequent extraction, feed and cutting downstream of the shears unit;

feed detection means to detect the extent of extraction of the sub-bundle of rods beyond the cutting plane of said shearing unit on the line of subsequent extraction, feed and cutting of the sub-bundle of rods, in association with means to stop the feed on the desired cutting length and to operate the cutting action and subsequently unload the cut lengths.

An advantageous feature of the invention is that the advance of the second and third extraction devices are associated with copying equipment of the feed comprising means for the emission of electrical pulses proportional to the said feed, being connected to at least one electronic programming, memorising and control device capable of transmitting control pulses to stop the feed system and control pulses to operate the shears, as well as receiving the said pulses transmitted by the means transmitting the pulses and carrying out their relative totalization comparing the latter with that programmed to select the moment when the feed must be stopped for the rods in the said position to be cut.

The advantages gained from this invention consist in that:

the necessarily time-consuming first extraction and butting operations are not added to the cutting process and relative feeding, so reducing operating times;

the cutting operating times hardly interrupt the feed of the feed of the material which is practically continuous;

the disadvantages of taking rods from the storage bundle every time are obviated;

all the complex systems of ledge stops and stopping the rod feed are eliminated by greatly simplifying the machine and making it possible to vary the cutting lengths in a simple, automatic and programmed way.

The invention will now be described in more detail with reference to the accompanying drawings, in which:

FIG. 1 is a schematic plan showing the arrangement of an apparatus according to the present invention comprising a single cutting plant, positioned on a portal bench which is movable transversely to align with a bundle of rods, the figure also showing the first stage of the partial extraction of rods from one of the store bundles;

FIGS. 2 to 22 show in a similarly schematic manner, with only the groups of machines involved, the operational stage connected to the subsequent handling of the material.

As can be seen in the above-mentioned Figures, the cutting line consists of a portal bench "A" which is movable transversely on rails "B". The bench "A" starting from the side where the rods "b" are extracted from the store, consists of:

an elongated bench structure mounted on a carriage 1;

a first extraction device 2 arranged so that it slides longitudinally along the bench and fitted with a pick-up winch to grip the top end of a particular bundle of rods in the store so as to extract them axially for a distance shorter than the entire length of the rods as indicated by the arrow in FIG. 1. This pick-up winch for gripping and extracting the rods can be any rod extraction device known in the art such as a draw winch with a cable and chain, this being the simplest system, or pincers which can be moved longitudinally, or any other suitable extraction system;

a second extraction device 3 positioned on the said bench 1 next to the first extraction device 2 and arranged so as to receive from the first extraction device 2 a part "b'" of the bundle of rods "b" which the first extraction device has already begun to extract. More particularly, this second device 3 consists of pincers 3.1 which can be moved longitudinally and are positioned with the grip opening along the feed line "X-X" of the respective bundle of rods on the bench. These pincers 3.1 will therefore be like a rapid vice to grip the bundle of rods "b'" in said position and these pincers 3.1 can slide longitudinally backwards and forwards along the line "X-X" by means of a fluidynamic jack 3.2;

shears 4 arranged downstream of the second extraction device 3 along the said feed line "X-X" to cut the rods "b'" advancing down the line;

a third extraction device 5 arranged downstream of the shears 4, positioned and structured like the second extraction device 3, with similar pincers 5.1 and jack 5.2, to grip and extract the rods as it travels backwards and forwards placing itself alternately opposite the former extraction device, along the feed line "X-X", after the shears;

an unloading device 6, positioned below the pincers 5.1 of the third extraction device 5 and downstream of the shears 4, consisting of a monitored roller path for unloading of the cut material "b''''" along the feed line "X-X". This unloading device 6 has a second lateral off-line receiving device 7 for the sections of cut rod "b''''". The operating stages of the machine develop as shown in the diagrams, the movement being indicated by the arrows in FIGS. 1 to 22, the latter develop as follows:

the first extraction device 2 partially extracts a first bundle of rods "b" from a storage bundle (FIG. 1);

this same first extraction device or an intermediate device easily devised and not shown since it is of known art and within the knowledge of an expert in this area, after butting (which can be done manually by the operator in charge of transferring the rods, by aligning them at the top end in groups to be transferred or even by intervening beforehand to perform preliminary butting of the entire partially extracted bundle "b") takes a part of this partially extracted bundle and transfers it onto the feed and cutting line "X-X" (FIG. 2);

the second open extraction pincers 3.1 grip the bundle of rods to be cut "b" (FIG. 3);

the pincers 3.1 then return to the starting position and regrip (FIG. 5) then moving forward against causing the bundle of rods to advance further, the latter thus going beyond, in this or in subsequent phases, both the cutter and the third pincers 5.1 which have already been previously opened (FIG. 6);

at this point while the second pincers 3.1 open, the third pincers 5.1 grip the rods and both travel away from each other in a symmetrical manner from the shears 4, the second pincers 3.1 then gripping and the third 5.1 opening (FIG. 7);

the stages thus succeed each other in opposing movement causing the rod to advance continuously until the required cutting length is reached (FIGS. 8 and 9), then stopping to enable the cut to be effected (FIG. 10) and the section of cut rod to be unloaded by the unloading device 6, whilst the synchronous movement of the pincers then resumes as previously described for the subsequent feed of material for the next cuts (FIGS. 11 to 15), and unloading of the cut pieces (FIG. 16);

the cycle repeats itself until the length of rods is used up (FIGS. 17, 18 and 19), the end pieces of the latter being cut off (FIG. 20);

the operation ends with the final lengths being unloaded (FIG. 21) while the two pincers opposing the shears 3.1 and 5.1 return to the condition in which they started to receive a new bundle of rods "b'" from the first extraction device 2 as at the beginning of the operation (FIGS. 21 and 22);

when the first bundle of rods "b" partially extracted from the first extraction device 2 is used up, the latter, during the cutting stage of the last partial bundle "b'", has plenty of time to make a new partial extraction and butt another bundle of rods "b", preparing them for the continuation of the cycle without interruptions and dead waiting time.

Obviously, the rods being cut "b'" consist of a limited number of rods usually inversely proportional to their diameter and depending both on the line gripping-pincers 3.2, 5.2 and the type of shears used 4. As a rule the bundle of rods "b'" being handled on the line, is gripped and moved forward, the rods being adjacent each other and lying in the same plane so as to enable cutting to take place at the same time by operating the opposing knives of the shears 4. The type of pincers used may be the type with alignment cheeks, the rods being aligned by bringing the cheeks nearer by a distance which is equal to, slightly more than, the diameter of the rods, for this reason not gripping the bundle, but later gripping the bundle transversely with a subsequent orthogonal cheek positioned opposite a support by squeezing one rod against the other. Pincers of this type are particularly described in the Italian patent application filed in the name of the same applicant at the same time as the present application.

We claim:

1. A method for cutting metal rods into shorter lengths using apparatus including means for storing rods arranged in a fixed manner, parallel and arranged side by side in groups of bundles with homogeneous characteristics, the storing means being connected with at least one movable cutting line at the top end of the bundles of rods of said storing means, the cutting line being movable transversely and in alignment with the rods and comprising means for the extraction of rods from said stored bundles, shears disposed across the cutting line, means for advancing the rods longitudinally along the cutting line and means for determining the required length of the pieces to be cut, wherein the method comprises actuating said cutting line in accordance with the following steps:

extracting longitudinally from a predetermined bundle of rods of the storing means, taking for an initial distance less than the complete length of the bundle, a first bundle of rods;

transferring, from said first partially extracted bundle of rods on said cutting line, a set number of rods equal to or less than the number of rods in the partially extracted bundle of rods using a first extraction device, said set number forming a sub-bundle;

gripping said sub-bundle using a second extraction and feed device, drawing the sub-bundle along said line for subsequent extraction and cutting, and continuing such extraction until passing beyond the shears;

gripping said sub-bundle using a third extraction and feed device drawing the sub-bundle beyond said shears and continuing the extraction in association with said second extraction and feed device until a desired cutting length is reached;

cutting the sub-bundle of rods that has passed beyond said shears using the shears and unloading the cut pieces;

regripping said sub-bundle using the second extraction and feed device upstream of the shears and continuing the feeding of the sub-bundle beyond said shears;

regripping said sub-bundle using the third extraction and feed device downstream of said shears and continuing the feeding of said sub-bundle beyond the shears until the next required cutting length is reached;

cutting the next section of the sub-bundle of rods and repeating the cycle of the above steps until the entire length is used up;

unloading the last waste tailend section of the sub-bundle of rods along a different path;

transferring a new sub-bundle of rods from said first partially extracted bundle onto said cutting line for subsequent extraction, feed and cutting, using said first extraction device;

gripping said new sub-bundle of rods, using the second extraction and feed device upstream of said shears, and continuing the extraction, feed and cutting following the steps previously set forth;

repeating the cycle of the transfer of sub-bundles from the first partially extracted bundle onto said line of further extraction, feed and cutting, until all of the first partially extracted bundle is used up;

during the procedure of further extraction, feed and cutting of said last sub-bundle, proceeding to a new successive partial extraction of a second bundle, using said first extraction device, from said stored bundles; and resuming the cycle of transferring the sub-bundles onto said line of subsequent extraction, feed and cutting.

2. The method of claim 1, wherein said cutting line includes a portal bench having an underlying system of guide rails, said first extraction device being slideable along said guide rails; and with said second and third extraction and feed devices being movable for travel lengths completely upstream and downstream, respectively, of said shears.

3. The method of claim 2, wherein each of said extraction and feed devices includes a gripping pincer and a fluidynamic jack connected thereto for displacing the gripper along its respective travel length.

4. The method of claim 3, wherein said pincers of said second and third extraction and feed devices grip each particular sub-bundle alternately, the pincer of the second device gripping as it moves downstream towards said shears and the pincer of the third device gripping as it moves downstream away from said shears.

* * * * *